Patented June 24, 1952

2,601,291

UNITED STATES PATENT OFFICE 2,601,291

NONFREEZING SILICA SOLS STABILIZED WITH ORGANIC AMINE COMPOUNDS

Samuel C. Horning, Wilmington, Del., and Charles W. Shay, Upper Providence Township, Delaware County, Pa., assignors to E. I. du Pont de Nemours & Company, Wilmington, Del., a corporation of Delaware No Drawing. Application November 18, 1949, Serial No. 128,255

7 Claims. (Cl. 252—313)

This invention relates to silica sols stabilized against the effects of freezing by the addition of a minor amount of a soluble, aliphatic amine.

Colloidal silica solutions when frozen do not redisperse. Freezing has the effect of agglomerating the particles so that, depending upon the exact character of the sol, in some instances the sol becomes very turbid while in others the particles precipitate from the solution as large agglomerates. Once the particles have been agglomerated or caused to form clusters by freezing there is no readily available means for returning the sols to their original state.

The injurious effects of freezing make the marketing of silica sols difficult during the winter months because such products are so often stored in places where they may be frozen. They may also be frozen in the course of shipment. The problem is also met with various products such as wax or coating compositions which contain silica sols.

According to the present invention a silica sol is stabilized against the effects of freezing by dissolving in the sol a small amount of a soluble, aliphatic amine. A sol thus stabilized can be frozen and thawed a number of times with but little damage to the sol. Each time after thawing the sol returns to substantially its previous condition, but there is occasionally an increasing turbidity with many repeated cycles of freezing and thawing or with a prolonged period of being frozen. The stability which is lent by the use of amines according to the invention is sufficient to permit the handling of silica sols and of waxes and other preparations containing silica sols without the difficulties due to accidental freezing which has heretofore been so great a problem.

The invention may be used to advantage with any silica sol in which colloidal silica is suspended in water. The various colloidal silica solutions known in the trade can, any of them, be used, but the greatest advantage is obtained with the more concentrated sols containing 15 per cent up to 30 per cent or even more of $SiO_2$.

Silica sols prepared, for instance, by dialysis can be used. Again the type of sols prepared in Neundlinger Patent 1,835,420, may advantageously be stabilized according to the invention. Silica sols suitable for use in compositions of the invention may also be prepared by dispersing in water a fume made by volatilizing silica and condensing the silica in the form of very small particles. A silica fume made by hydrolyzing silicon tetrachloride vapor in steam also yields particles which can be suspended in water to prepare sols useful according to the present invention. Again, sols of the type shown in the White Patent 2,375,738 may be used.

Silica sols for use in compositions of the invention may also be prepared by ion-exchange as in the Bird Patent 2,244,325. Similarly, sols may be used which are prepared following the processes of the Voorhees Patent 2,457,971. A silica sol which may most advantageously be used according to the invention is of the type disclosed in the Bird patent but additionally characterized by the silica having an ultimate particle size not exceeding about 0.03 micron, an extinction coefficient of less than 0.25 and being prepared by passing an alkali silicate solution through an acid regenerated ion-exchange material, all as described in Iler application, Serial No. 699,037, filed September 24, 1946, now abandoned.

By "ultimate particle size" is meant the average size of particle present when the solution is diluted to about 0.1% silicon dioxide with water and dried in a very thin layer deposit.

When solutions of colloidal silica having the same concentration of silicon dioxide are compared, the relative transparency to light is an indication of the type of particles present. However, by working with monochromatic light, and by measuring the percentage of light transmitted through a solution of given depth at a given concentration of silica, there can be calculated a constant known as the "extinction coefficient." This is expressed by the following formula:

$$E_{1\,cm.}^{1\%} = \frac{1}{pL} \log_{10}\left(\frac{I_0}{I}\right)$$

where $E_{1\,cm.}^{1\%}$ = extinction coefficient,
$p$ = per cent by weight of $SiO_2$ in the colloidal solution,
$L$ = length of adsorption cell in centimeters,
$I_0$ = the transmission of the dispersion medium (for water this is 100), and
$I$ = observed transmission of light of a given wavelength as compared to the transmission of pure water.

It will be noted that the extinction coefficient for a given type of solution is a constant which is independent of the concentration of the solution and of the length of the cell through which the light passes, but the numerical value depends upon the manner in which the concentration of the solution is expressed and upon the unit in which the cell length is measured. In this case, the extinction coefficient is given in terms of the percentage by weight of silica in solution and in centimeters of cell length.

The preferred aqueous sols for use according to the invention are those having particle sizes ranging from about ten to one hundred and fifty millimicrons in diameter. The sols of the White Patent 2,375,738 are such materials and a number of the prior art sols contain particles in the range described.

A preferred sol for use according to the invention is prepared by heating a silica sol which has been made by ion-exchange in the manner described in Bird 2,244,325 to a temperature above 60° C. and adding further quantities of the same type of sol until at least five times as much silica has been added to the original quantity as was at first present. The product thus prepared is stable against gelation at high temperatures and pressures and it contains particles above ten millimicrons in diameter and below about one hundred and fifty millimicrons in diameter. The process as outlined is fully described and is claimed in the application of Max F. Bechtold and Omar E. Snyder in application Serial No. 65,536, filed December 15, 1948, now Patent No. 2,574,902.

Silica sols to be sold as such according to preferred practices of the invention will ordinarily contain about 15% of $SiO_2$ or up to, say, 30% or even more. Sometimes it may be desirable to stabilize more dilute sols and this may be done according to the invention. The principal advantage of stabilizing very dilute sols will be found when small amounts, say, 1 to 5% of $SiO_2$ are present in emulsions of waxes or in coating compositions.

The silica sols before addition of amine should preferably have a pH below 10.5 and specifically it is preferred that the pH of the sols fall within the range pH 10.5 to pH 9.

The preferred sols prepared by the processes of the Bechtold and Snyder application mentioned above contain up to about thirty per cent or so of $SiO_2$ and have a $SiO_2 : Na_2O$ ratio of from 60 : 1 to 130 : 1.

Reference has been made above to the use of sodium silicates in making sols, but it will be understood that potassium silicates can be used in the same way and are equivalent.

A silica sol is stabilized against the effects of freezing by dissolving in the sol a minor amount of a soluble amine. The amines can be primary, secondary, or tertiary, and the substituents on the nitrogen can be any organic group, either acyclic or alicyclic. The nitrogen atom may be included in a heterocyclic ring as in piperidine and morpholine. The substituents on a nitrogen atom may be such aliphatic groups as methyl, ethyl, and propyl, and there may be used, for instance, mono-ethyl-amine and mono-amyl-amine. More than one such group may be used and there may be employed, for instance, diethyl-amine, dipropyl-amine, and trimethyl-amine. Diamines may also be used such as ethylene-diamine and propylene-diamine. Instead of saturated acyclic groups, one may use groups of various degrees of unsaturation such as allyl-amine. Alkanol-amines may be used and as examples there can be mentioned triethanol-amine, diethanol-amine, and mono-ethanol-amine.

The amines used should be sufficiently soluble in the sol to permit dissolving, say, one per cent or more in water.

When the chain-length of an acyclic substituent becomes too great, as for instance when octyl amine is used, the sols are actually precipitated. Accordingly, it is preferred that the amines used have no chain of more than six carbon atoms.

Any soluble aliphatic amine may be used. By this we mean to include any non-aromatic amine, that is, both acyclic and alicyclic, as illustrated above.

The amount of an amine to use will vary considerably with the concentration of silica in the sol, with the effectiveness of the particular amine, and with the magnitude of effect desired.

Ordinarily, about 0.05 to 0.25 mol of an amine should be used per hundred grams of $SiO_2$ in the sol or composition to be stabilized. If a particular product is apt to be frozen frequently or is apt to be frozen for long periods, then much larger amounts can advantageously be used up to, say, 0.3 mol or even higher. Again, if the amine exercises some valuable function in the particular formulation, larger amounts may be used to take advantage of other valuable properties.

As has already been observed, amines for stabilizing silica sols can advantageously be used for the treatment of mixtures of silica sols with other materials as well as for treatment of the sols themselves. For instance, when silica sols are mixed with wax emulsions a small amount of an amine can be introduced, depending upon the $SiO_2$ content, so that after freezing the emulsions will return to their original condition when they are thawed. By the use of an amine, as outlined above, such emulsions can be frozen and thawed a number of times without a great degradation.

It will be observed that the particular amine selected will vary depending upon the specific use. In waxes it will ordinarily be desirable that the amine be volatile. It should be as volatile as water or should form an azeotrope with water so that it will evaporate from the emulsion. Morpholine is especially advantageous as a stabilizing agent in wax emulsions for this reason.

The amines may also be used as stabilizing agents to protect silica sols against the effects of freezing in paint compositions, in mixtures of silica sols with oils and with other treating agents for textile fibers, in mixtures of silica with various paper treating and coating agents, and in silica compositions containing rubber latex and adapted to be used as adhesive and film-forming compositions.

In order that the invention may be better understood reference should be had to the following illustrative examples:

EXAMPLE 1

The silica sol used was one prepared as in the above-mentioned Bird patent and thereafter densified as in Bechtold and Snyder application Serial No. 65,536 by heating above 60° C. while running five times the original quantity of ion-exchange effluent into a heel. The product had a pH of ten and the particles in the sol were about twenty millimicrons in diameter as shown by an electron micrograph. The sol contained twelve per cent $SiO_2$ by weight.

To the sol there was added eight per cent of ethylamine by weight based upon the amount of silica. This is 0.18 mol of amine per 100 grams of $SiO_2$. No change was effected in the appearance of the sol and the ethylamine dissolved readily. The pH rose to 11.46. The sol was then frozen and thawed six times and after the sixth thawing there was no precipitate. The sol was very slightly turbid after the repeated freezings and thawings.

The same sol without the amine upon being frozen only once and then thawed showed a virtually complete precipitation of the silica.

A similar sol was modified by the addition of four per cent of ethylamine and after five cycles of freezing and thawing, there was a slight sediment formed. The protection against precipitation and alteration of the sol was almost complete and for most commercial purposes would be quite satisfactory. Even with two per cent of ethylamine the protection was fair through four cycles, but there was precipitation on the fifth.

EXAMPLE 2

A twelve per cent silica sol as used in Example 1 was protected against injury by freezing by dissolving therein 15 per cent by weight based upon the $SiO_2$ content of morpholine. This is 0.17 mol of morpholine per 100 grams of silica. The sol was protected against marked injury through four freezing and thawing cycles and after eight cycles there was only a slight change in the sol. Smaller amounts of morpholine give somewhat smaller amounts of protection down to about two per cent at which point the protection is only moderate. Similar results are obtained with 15 per cent of morpholine in a similar sol containing 28 per cent $SiO_2$.

EXAMPLE 3

A carnauba wax emulsion of the type customarily used for heavy duty maintenance was modified by inclusion of silica. The wax composition contained 12 per cent solids, consisting of carnauba and oxidized paraffin waxes, emulsifying agents, and an ammonia-soluble resin. To the wax emulsion there was added a colloidal silica solution diluted to the same concentration of solids as the wax emulsion so that there was one part of $SiO_2$ by weight for each two parts by weight of solids in the wax. This formulation constitutes no part of the present invention and is covered in Iler, Serial No. 775,375, filed September 20, 1947, now Patent No. 2,597,871, issued May 27, 1952.

To the modified wax emulsion there was added eight per cent of ethylamine based upon the weight of $SiO_2$. The properties of the composition were not adversely affected and the formulation was protected against modification by freezing through five cycles. After five cycles there was a small loss of gloss, though the gloss was still entirely satisfactory.

In a corresponding sample which was the same except for the omission of ethylamine, after a single cycle of freezing and thawing the gloss was completely destroyed and the silica was completely precipitated. The film was gray and ugly.

EXAMPLE 4

In the following example there is shown a paint composition, the parts being by weight:

*Composition A*

| | Per cent |
|---|---|
| Casein solution | 25.97 |
| 28% ammonia solution | .34 |
| Dehydrated caster oil fatty acids | 1.01 |
| 25-gallon linseed oil ester gum varnish | 10.29 |
| Water | 4.22 |
| Mica | 4.47 |
| Titanium dioxide pigment | 9.44 |
| Lithopone | 44.26 |
| | 100.00 |

The casein solution was prepared as follows:

| | Per cent |
|---|---|
| Water | 80.20 |
| Casein | 14.02 |
| Borax | 1.89 |
| Pine oil | 1.00 |
| Sodium fluoride | 1.50 |
| Anti-Foam H | 1.39 |
| | 100.00 |

The Anti-Foam H used in the above composition was a hydrogenated vegetable oil obtained from American Cyanamid Company.

The water, casein, borax, and pine oil were added together and allowed to soak at room temperature for 1 hour and then heated, with agitation, to bring the temperature to 155° F. in about 45 minutes. The sodium fluoride was then added and the heating continued at 185° F. for about 20 minutes, after which the Anti-Foam H was added and the heating stopped. Sufficient water was then added to replace the amount lost by evaporation.

The materials were mixed in the order listed and given one pass on a 3-roll mill. The product was a highly bodied semi-solid.

*Composition B*

| | Per cent | |
|---|---|---|
| Composition A (as above) | 74.48 | Mixed |
| Clay | 2.12 | |
| 18% colloidal silica dispersion | 18.62 | Mixed |
| Mono-ethyl-amine (70% solution) | 4.78 | |
| | 100.00 | |

The Composition A and the clay were well mixed; and the dispersion of colloidal silica and mono-ethyl-amine were likewise well mixed. These two mixtures were then well blended to form the final product.

The amount of mono-ethyl-amine was greatly in excess of that needed to stabilize the composition against freezing. The excess served to modify the apparent viscosity of the product.

The apparent viscosity of the product after dilution (one volume of water to two of product) was 90 centipoises. A similar product without the mono-ethyl-amine had an apparent viscosity, under like conditions, of 3,500 centipoises.

The wet erosion resistance of a film of the product after 7 days was 25 cycles, as compared with only 7 cycles for a control without the silica.

The method of determining the wet erosion resistance was as follows: The paint to be tested was applied by means of a doctor blade (in this case a 4.2 mil Bird film applicator) to acid-ground and sand-blasted glass of uniform texture. This film was allowed to dry for a stated period and then tested in a machine designed to simulate washing with a soft rag and mild soap solution. The machine comprised an articulated arm provided with clamps to hold a gauze-felt pad (2" x 3"). This arm was operated by an electric motor geared so that 22 cycles were completed per minute. The glass panel, to which the test material had been applied, was clamped in the machine so that the arm moved freely over the surface. The pad was saturated with a .25% soap solution, weighted in place with a 100-gram weight and the arm set in motion (reciprocating in a straight line). The end-point was recorded as a failure which revealed any part of the glass under the film ½" or more in length. When required, additional soap solution was added to the surface to minimize mechanical rupture of the film.

This application is a continuation-in-part of our application, Serial No. 761,999, filed July 18, 1947, now abandoned.

We claim:

1. An aqueous silica sol containing a water-soluble aliphatic amine having no chain of more than six carbon atoms, the amount of amine being about from 0.05 to 0.25 mol per hundred grams of $SiO_2$ in the sol.

2. An aqueous silica sol containing from about 0.05 to 0.25 mol of morpholine per hundred grams of $SiO_2$ in the sol.

3. An aqueous silica sol containing a water-soluble alkanolamine having no chain of more than six carbon atoms, the amount of amine being about from 0.05 to 0.25 mol per hundred grams of $SiO_2$ in the sol.

4. An aqueous silica sol modified by the addition of, per 100 grams of $SiO_2$ in the sol, about from 0.05 to 2.2 mols of a water-soluble aliphatic amine having no chain of more than six carbon atoms.

5. An aqueous silica sol stabilized against the effects of freezing by the inclusion therein of, per 100 grams of $SiO_2$ in the sol, about from 0.05 to 2.2 mols of a water-soluble aliphatic amine having no chain of more than six carbon atoms.

6. An aqueous silica sol containing about from 0.05 to 2.2 mols of morpholine per hundred grams of $SiO_2$ in the sol.

7. An aqueous silica sol modified by the addition of, per hundred grams of $SiO_2$ in the sol, about from 0.05 to 2.2 mols of a water-soluble, organic amine having no chain of more than six carbon atoms, the amine being selected from the group consisting of acyclic and alicyclic, non-aromatic amines.

SAMUEL C. HORNING.
CHARLES W. SHAY.

REFERENCES CITED

The following references are of record in the file of this patent:

UNITED STATES PATENTS

| Number | Name | Date |
|---|---|---|
| 2,422,499 | Pierce et al. | June 17, 1947 |
| 2,435,379 | Archibald | Feb. 3, 1948 |